United States Patent [19]
Shimizu

[11] Patent Number: 6,008,854
[45] Date of Patent: *Dec. 28, 1999

[54] REDUCED VIDEO SIGNAL PROCESSING CIRCUIT

[75] Inventor: Yutaka Shimizu, Ota, Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/730,596

[22] Filed: Oct. 15, 1996

[30] Foreign Application Priority Data

Oct. 16, 1995 [JP] Japan .................................. 7-267107

[51] Int. Cl.⁶ .................................................. H04N 7/081

[52] U.S. Cl. ........................... 348/445; 348/565; 348/567; 348/473; 348/581

[58] Field of Search ...................................... 348/561, 562, 348/564, 565, 567, 568, 460, 465, 473, 445, 558, 559, 556, 581, 582, 441; H04N 7/081

[56] References Cited

U.S. PATENT DOCUMENTS

| | | | |
|---|---|---|---|
| 5,270,831 | 12/1993 | Parulski et al. | 358/403 |
| 5,402,187 | 3/1995 | Ezaki | 348/474 |
| 5,455,631 | 10/1995 | Nakajima | 348/556 |
| 5,557,336 | 9/1996 | Nakajima | 348/556 |
| 5,638,485 | 6/1997 | Kobayashi | 348/556 |

*Primary Examiner*—Michael H. Lee
*Assistant Examiner*—Jean W. Désir
*Attorney, Agent, or Firm*—Loeb & Loeb, LLP

[57] ABSTRACT

An input processing section reduces the content of an input video signal according to reduction ratio data, and the reduced video signal is stored in field memories. A display processing section reads a reduced video signal from the field memories to execute window display processing thereto according to video size SIZ data and video position data (X, Y). In this event, an input video clock generator, controlling a writing operation to the field memories, computes video size SIZ data from the reduction ratio data, and writes the SIZ data as a header, along with the reduced video signal, into the field memories via the input processing section. The SIZ data is read to be output to the display processing section and a display video clock generator for controlling reading.

4 Claims, 7 Drawing Sheets

DISPLAY POSITION DATA (X, Y)

REDUCED VIDEO SIGNAL PROCESSING CIRCUIT

BACKGROUND OF THE INVENTION

1. Field of the Invention

The present invention relates to a reduced video signal processing circuit for displaying a reduced input video scene in a window, using a buffer memory, such as a field memory, a frame memory, etc., wherein the reduction ratio is changeable.

2. Description of the Prior Art

A Picture in Picture (PIP) function has been generally known as a TV display function for displaying a plurality of scenes in the form of a window on one TV screen, instead of displaying one scene on the entire TV screen. With the arrival of the multimedia era, a further variety of display functions have been demanded. In particular, a window displaying function at a desired reduction ratio, which has become commonly used as an operating environment for personal computers, has also been demanded for TV displaying. In order to display a separate scene in the form of a window, a buffer memory, such as a field memory, a frame memory, etc., is necessary in order to retain synchronism between main and sub-scenes (inset-scenes).

Figure 6:
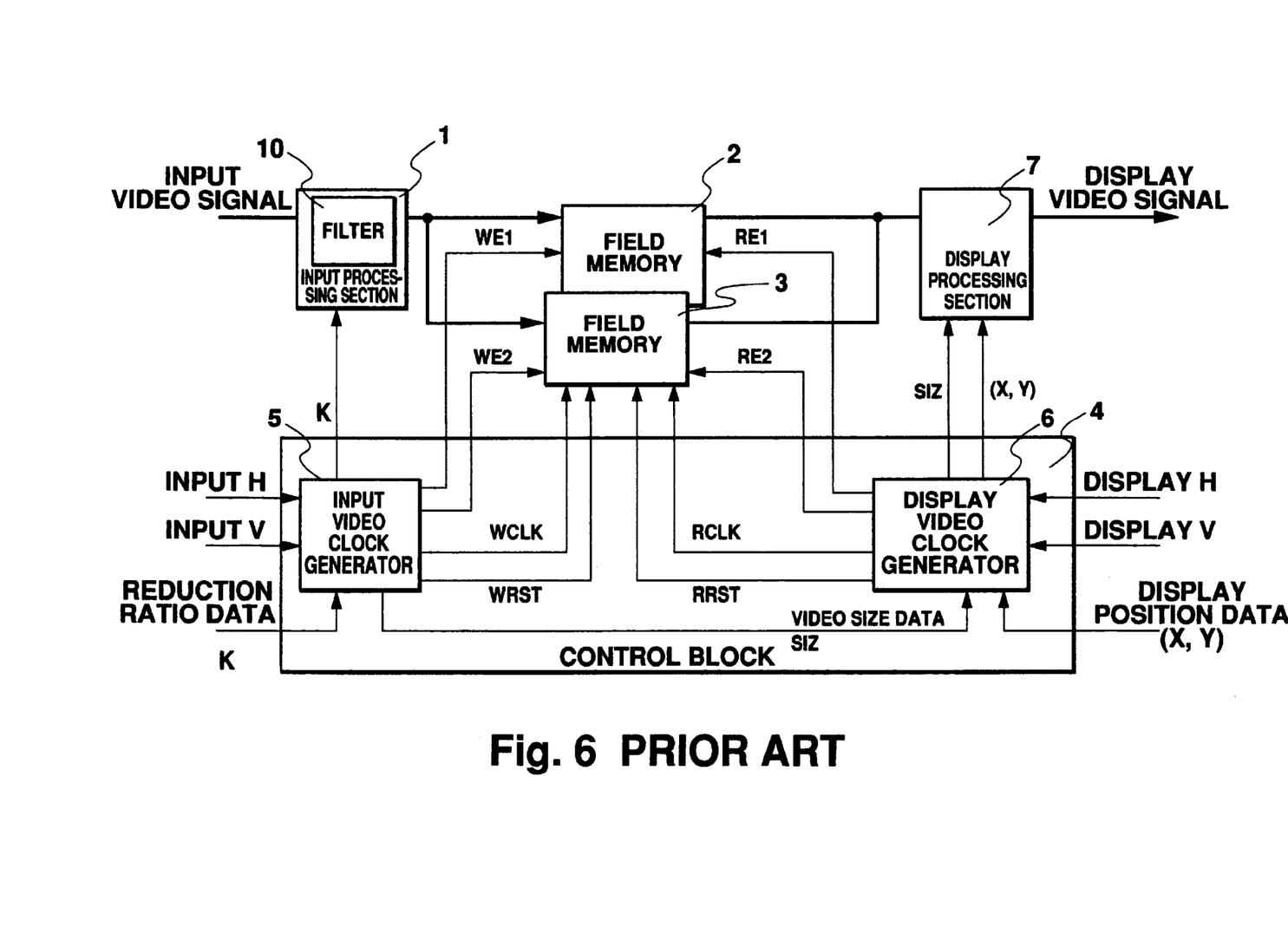
FIG. 6 is a block diagram illustrating a conventional reduced video signal processing circuit.

FIG. 6 is a block diagram showing a conventional reduced video signal processing circuit.

A video signal for a sub-scene which is displayed in the form of a window is input into an input processing section 1 which includes a filter circuit 10. The input video signal is then processed for size reduction (filtered) by the filter circuit 10 according to size reduction ratio data K before being provided to field memories 2 and 3. A writing operation to the field memories 2 and 3 is controlled by an input video clock generator 5 in a control block 4. The control block 4 is also provided with a display video clock generator 6 for controlling a reading operation from the memories 2 and 3. Size reduction ratio data K, one externally received, and the input video clock generator 5 supplies the data K to the input processing section 1.

Figure 7:
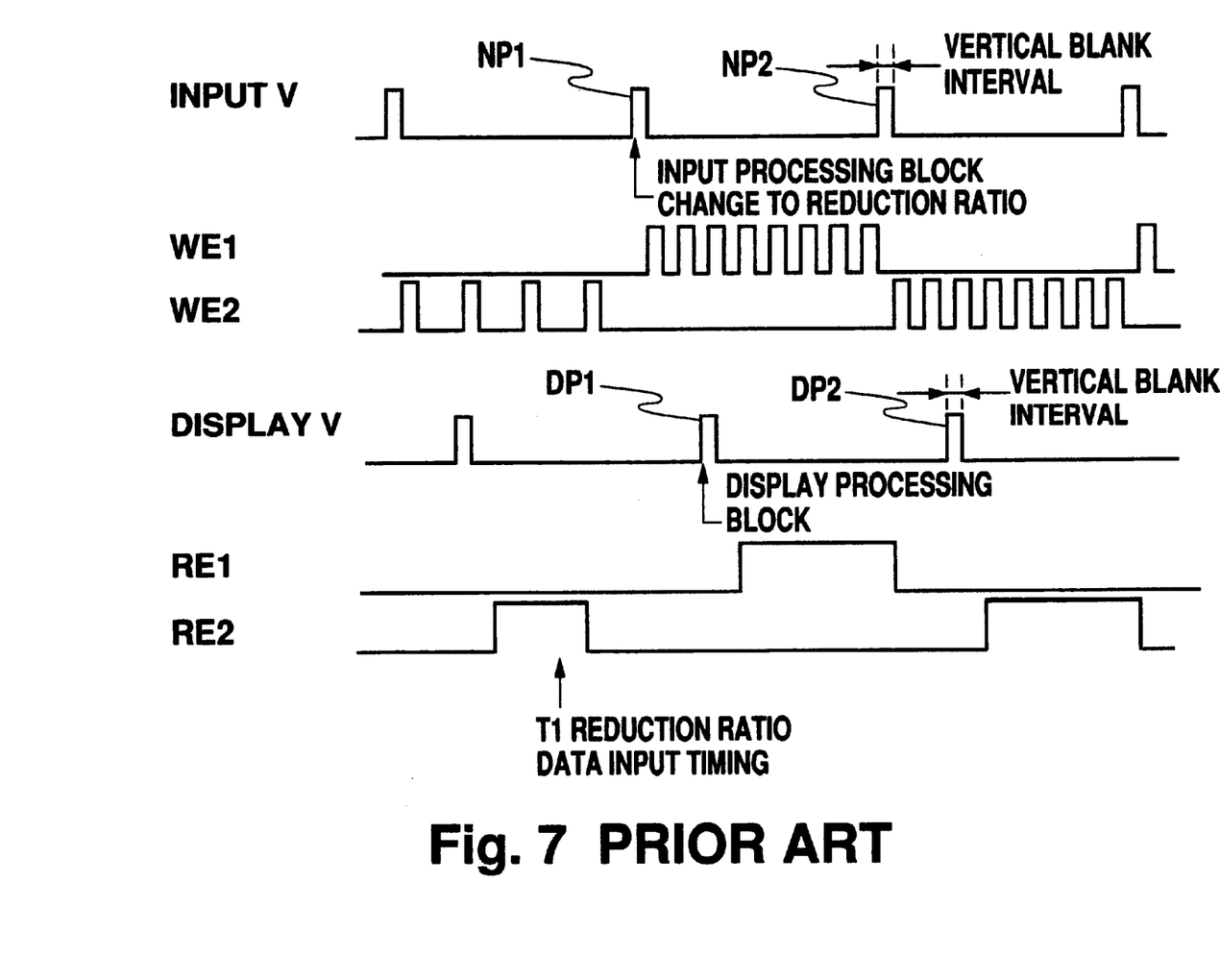
FIG. 7 is a timing chart for an operation of a conventional reduced video signal processing circuit.

Based on a horizontal synchronizing signal (Input H) and vertical synchronizing signal (Input V) of an input video signal received, the input video clock generator 5 outputs a write clock (WCLK), write enabling signals (WE1, WE2), and a write reset signal (WRST). A WCLK has the same rate as that of a pixel clock synchronous with an input H. WE1 and WE2 signals cause the field memories 2 an d 3 to be at an enable state alternately for every field during an effective display period of an input video signal. The field memories 2 and 3 incorporate address counters for independently addressing during writing and reading operations. After the counters are reset by a WRST signal, addresses of the counters are incremented by counting a WCLK while WE1 and WE2 signals are at an H (high) level, whereby a reduced video signal supplied from the input processing section 1 is written into the field memories 2 and 3. When size reduction ratio data K indicates "1," that is, when a reduction operation is not executed, WE1 and WE2 signals remain at an H level throughout an effective video period. When size reduction ratio data K is smaller than "1," on the other hand, the period when WE1 and WE2 signals are at an H level is adjusted according to the size reduction ratio data K. For instance, with size reduction ratio data K of "1/2, " as shown in FIG. 7, WE1 and WE2 signals are output at an H or L level in such a way that they become an H level for every other pixel. As a result, an input video signal subjected to half thinning processing in the filter 10 can be written into a memory.

Further, the input video clock generator 5 computes video size data (SIZ), based on the size reduction ratio data K, and supplies the SIZ data to the display video clock generator 6. For instance, provided that the numbers of horizontal and vertical pixels of an input video signal are "640" and "480," respectively, and the size reduction ratio data K is "1/2," SIZ data is computed to indicate H (horizontal) SIZ "320" and V (vertical) SIZ "240."

On the read side, in order to read a reduced video signal from the field memories 2 and 3, the display video clock generator 6 is supplied with a horizontal synchronizing signal (display H) and a vertical synchronizing signal (display V) of a display video signal for a main scene and a display position data (X, Y) for indicating a display position of a reduced scene, and outputs a read clock (RCLK), read enabling signals (RE1, RE2), and a read reset signal (RRST). RCLK has the same rate as that of a pixel clock synchronous with a display H. RE1 and RE2 signals cause the field memories 2 and 3 to be at an enable state alternately for every field during an effective display period of a display video signal. An RRST signal resets read address counters of the field memories 2 and 3 upon a rise of an RE signal. After the counters are reset by an RRST signal, a read address of the counters in the field memories 2 and 3 are incremented by counting an RCLK while RE1 and RE2 signals are at an H level, whereby a reduced video signal is read from the field memories 2 and 3. Note that the display video clock generator 6 may generate display H and V signals in cases where each timing thereof is previously known, so that an RRST signal, an RCLK, RE1 and RE2 signals, etc., are generated based on the display H and V signals.

Figure 3:
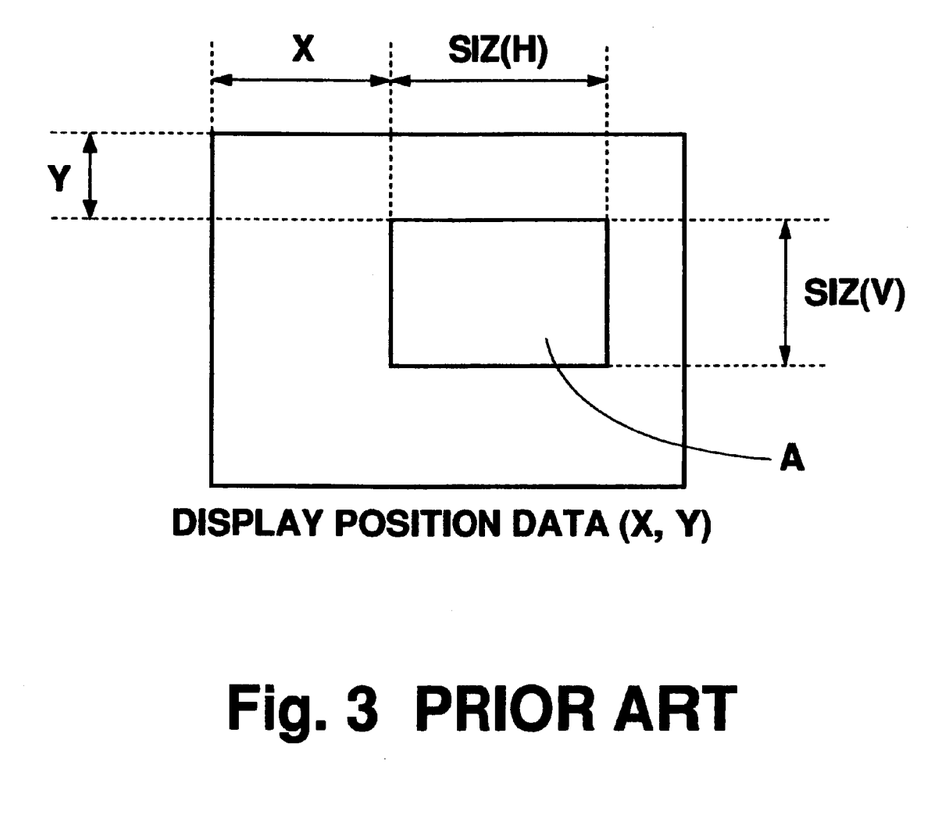
FIG. 3 illustrates an example of window displaying for reduced video.

FIG. 3 illustrates an input video signal A displayed in the form of a window, wherein display position data (X, Y) indicates a display position of a sub-scene with respect to a main scene (a display video signal), and video size SIZ data (H, V) indicates the size of a sub-scene to be displayed in the form of a window (a reduced video signal generated from an input video signal). For achieving such a window display, the display video clock generator 6 causes RE1 and RE2 signals to be at an H level only during an effective display period as shown in FIG. 7, based on the SIZ data (H, V) and the video position data (X, Y). In this case, RE1 and RE2 signals are continuously maintained at an H level throughout an effective display period, which is different from the input side.

The display video clock generator 6 supplies SIZ data (H, V) and video position data (X, Y) to a display processing section 7 which is provided downstream of the field memories 2 and 3, so that the reduced video signal read from the memories 2 and 3 are processed therein for window displaying through framing or addition of background data, and output as a display video signal.

In order to change a reduction ratio as desired in the foregoing procedure, the content of processes executed on the write and read sides must be changed in accordance with respective new reduction ratio data. However, if the content of a process is changed during reading and writing operations, distortion may be caused to a display video signal (displaying scene). Thus, an operation for changing a reduction ratio is executed during a vertical blank interval of a video to prevent distortion.

However, since an input V and a display V are not synchronous with each other, the above changing operation is conducted at different timings on the write and read sides. An example is taken, referring to FIG. 7, where a phase of a display V is delayed compared to that of an input V. When size reduction ratio data K is newly input at time T1, the reduction ratio is changed to the new ratio during a vertical blank period NP1 which is an immediately following interval of the time T1 in the input video clock generator 5 and the input processing section 1, so that a reduction operation and a write control operation are thereafter conducted based on the new reduction ratio. In the display video clock generator 6 and the display processing section 7, on the other hand, the reduction ratio is changed during a vertical blank period DP1 which is also an immediately subsequent interval to the time T1. Since this timing (DP1) is behind the changing timing on the input side (NP1), a video signal written in the changed reduction ratio is read from the memory in the changed reduction ratio after the time DP1.

Figure 8:
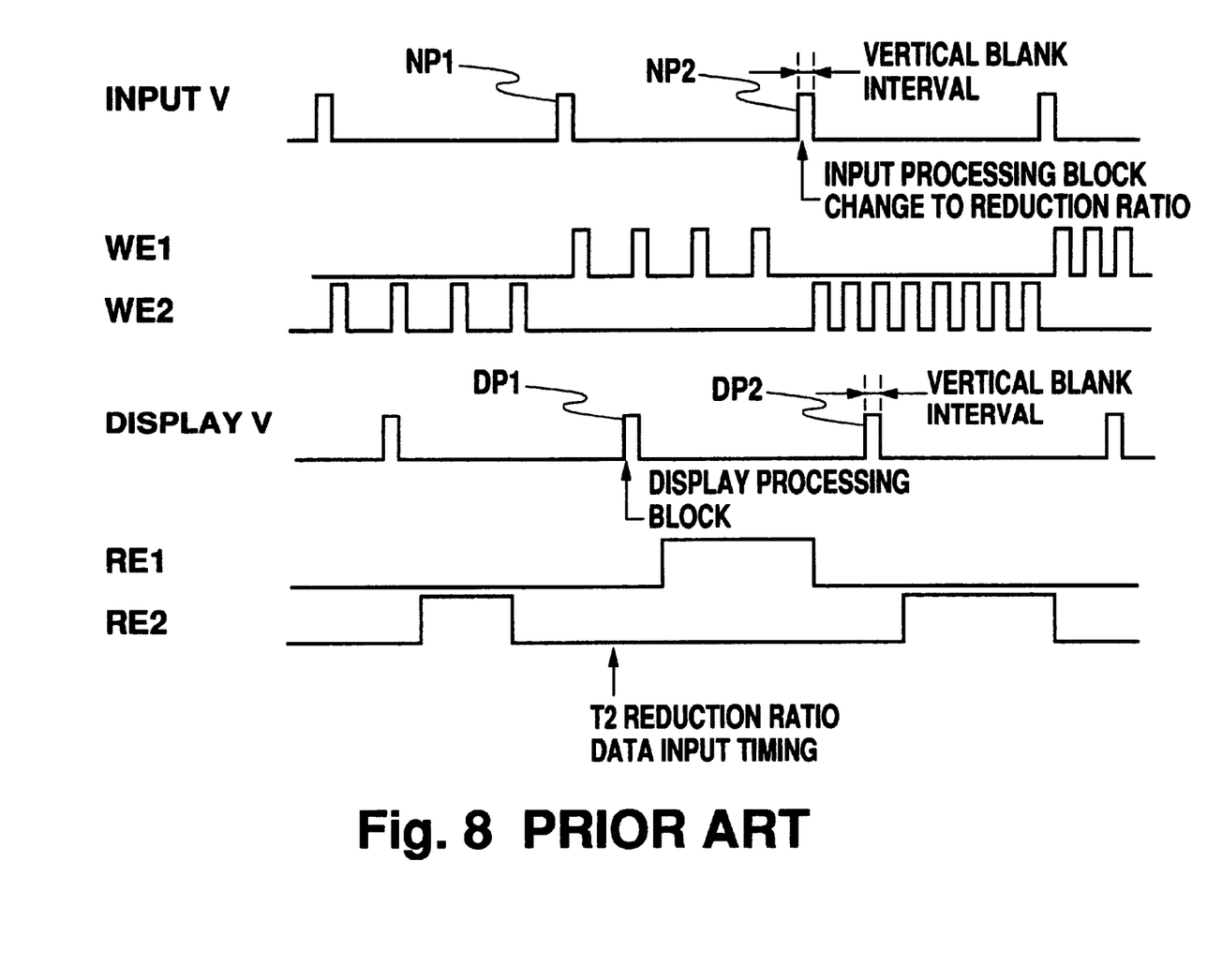
FIG. 8 is a timing chart for an operation of a conventional reduced video signal processing circuit.

In another case, referring to FIG. 8, where reduction ratio data is newly input at time T2 which is after the vertical blank interval NP1 of an input V and before the vertical blank interval DP1 of a display V, a reduction ratio is changed during a vertical blank interval NP2 after the time T2 in the input video clock generator 5 and the input processing section 1, and during a vertical blank interval DP1, before the interval NP2, in a display video clock generator 6 and the display processing section 7. In other words, the reduction ratio is changed on the display side prior to the input side. As a result, a video signal reduced in a previous reduction ratio (a reduction ratio before the change) is read in a changed reduction ratio to be displayed for a field subsequent to the change (DP1) on the read side. This causes significant distortion to a video displayed in a window. For this reason, the prior art has a problem in that a reduction ratio cannot be changed while a window display continues.

SUMMARY OF THE INVENTION

The present invention aims to provide a reduced video signal processing circuit capable of generating a reduced video signal in accordance with a changed reduction ratio whenever the change is made.

According to the present invention, an input processing and write control circuit reduces the an effective display period of an input video signal to form a reduced video signal, and adds data on a reduction ratio to the signal as a header. The reduced video signal attached by a header indicating a reduction ratio is stored in buffer memories, so that the header of a reduced video signal read from the buffer memories contains data indicating a reduction ratio. Thus, a display processing and read control circuit can obtain a display video signal containing a reduced video of the size according to the reduction ratio specified by the header. With this arrangement, it is possible to execute video signal processing, based on the reduction ratio for video signal stored in the buffer memories, and that allows displaying in accordance with a changed reduction ratio whenever the change is made. As a result, a reduction ratio can be changed with a reduced scene remaining displayed in a window.

Data on a reduction ratio to be added as a header is preferably video size data.

Further, the display processing read control circuit preferably controls the position of the reduced video, based on display position data externally supplied.

BRIEF DESCRIPTION OF THE DRAWINGS

The above and the other objects, features, and advantages will be further apparent from the following description of the preferred embodiment taken in conjunction with the accompanying drawings wherein.

DESCRIPTION OF THE PREFERRED EMBODIMENTS

Figure 1:
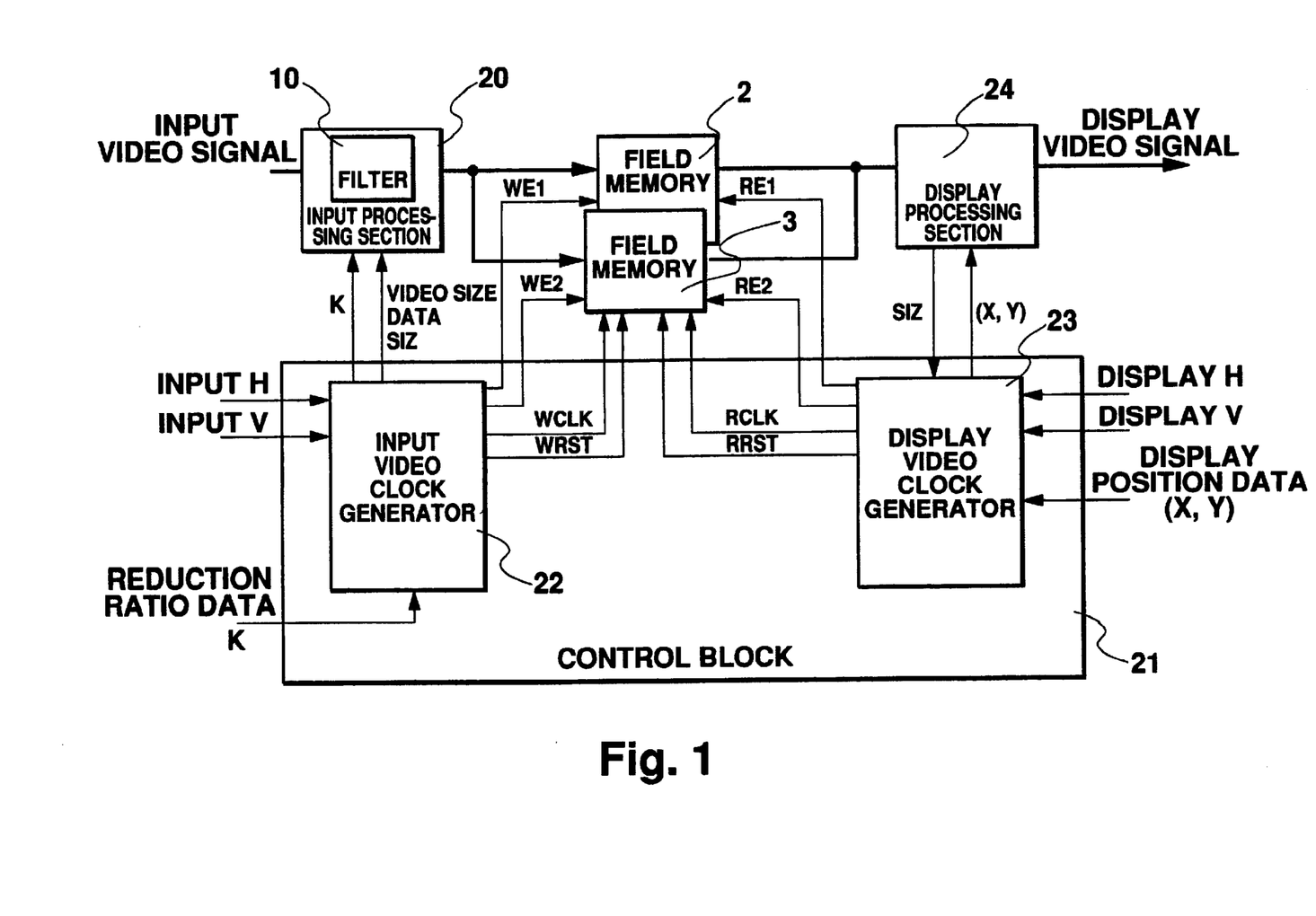
FIG. 1 is a block diagram illustrating a reduced video signal processing circuit of the present invention.

FIG. 1 is a block diagram illustrating a preferred embodiment of the present invention, including an input processing section 20, a control block 21, an input video clock generator 22, a display video clock generator 23, and a display processing section 24, which correspond to the sections 1, 4, 5, 6, and 7, respectively, of the conventional circuit shown in FIG. 6.

This embodiment is characterized by transmission of video size SIZ data from the input side to the display side with other configurations being almost the same as those of a prior art.

Figure 2:
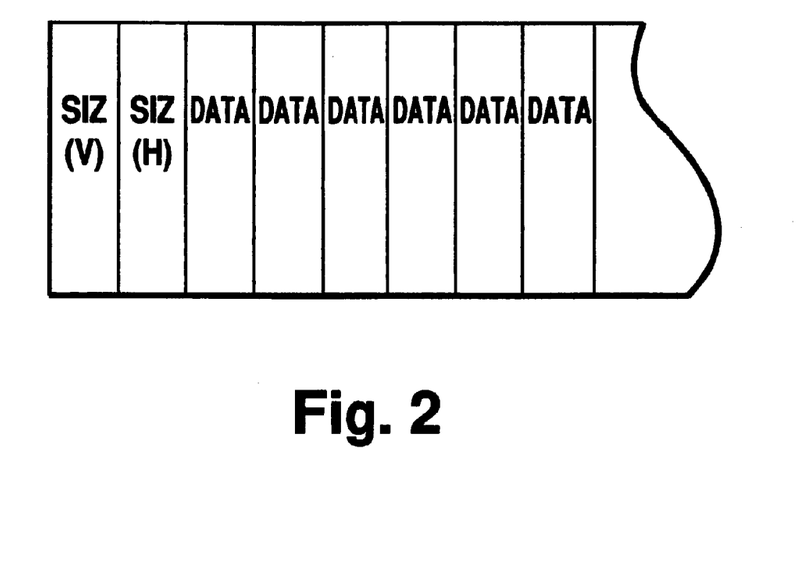
FIG. 2 illustrates a format for write data.

That is, the input video clock generator 22 receives size reduction ratio data K to compute SIZ data, similar to the prior art. The SIZ data, however, is not output to the display video clock generator 23, but output to the input processing section 20 instead. In the input processing section 20, the SIZ data is added to reduced video data as a header, as shown in FIG. 2, before being provided to the field memories 2 and 3. The SIZ data, along with the reduced video data, is then written into the field memories 2 and 3, based on various write control signals, such as a WCLK, a WRST signal, WE1 and WE2 signals, etc., supplied from the input video clock generator 22.

The SIZ data written into the memories 2 and 3 are read by the display processing section 24, based on various read control signals supplied from the display video clock generator 23, to be held therein and, at the same time, to be output to the display video clock generator 23. The display video clock generator 23 outputs read control signals, such as an RCLK, an RRST signal, RE1 and RE2 signals, etc., based on the SIZ data and display position data (X, Y) externally supplied, similar to the prior art, so that a reduced video signal is read from the field memories 2 and 3, based on those control signals. The display processing section 24, having the SIZ data and receiving display position data (X, Y) from the display video clock generator 23, executes a window displaying operation, based on those data, similar to the prior art. The operation result is then output to an externally provided video display as a display video signal for window displaying. Note that, WE1, WE2, RE1, and RE2 signals are raised earlier (than the prior art) as indicated by slant-line hatching in FIGS. 4 and 5 because write/read data include additional data (compared to those in the prior art,) corresponding to a header. That is, according to the present invention, execution of display processing in a changed reduction ratio is started when a header is read, immediately following a rise of RE1 and RE2 signals. Thus, an actual timing when a reduction ratio is changed is after completion of a vertical blank interval. However, this timing causes no problems in displaying since an effective display period, corresponding to which video is actually displayed on a screen, starts following reading of a header.

Figure 5:
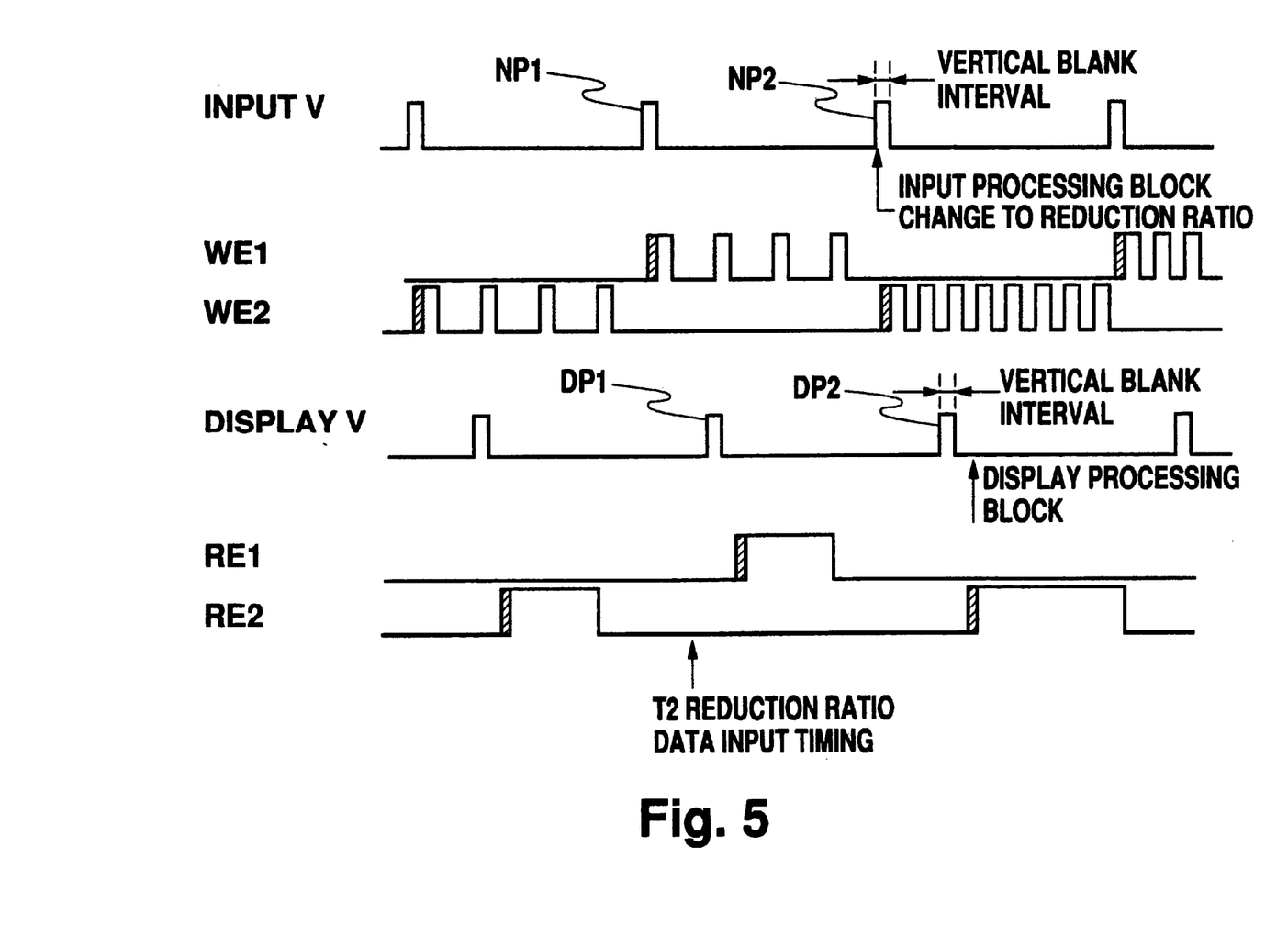
FIG. 5 is a timing chart for an operation of the reduced video signal processing circuit.

In particular, as shown in FIG. 5, in cases where reduction ratio data is changed at a time T2, immediately followed by a vertical blank interval DP1 of a display V, a reduction ratio will not be changed in the display processing section 24 until after the interval DP2 when the header of a video signal reduced in the changed reduction signal is read. Thus, a problem of the prior art, that is, displaying a video in an incorrect reduction radio, causing distortion to the video, can be prevented.

Figure 4:
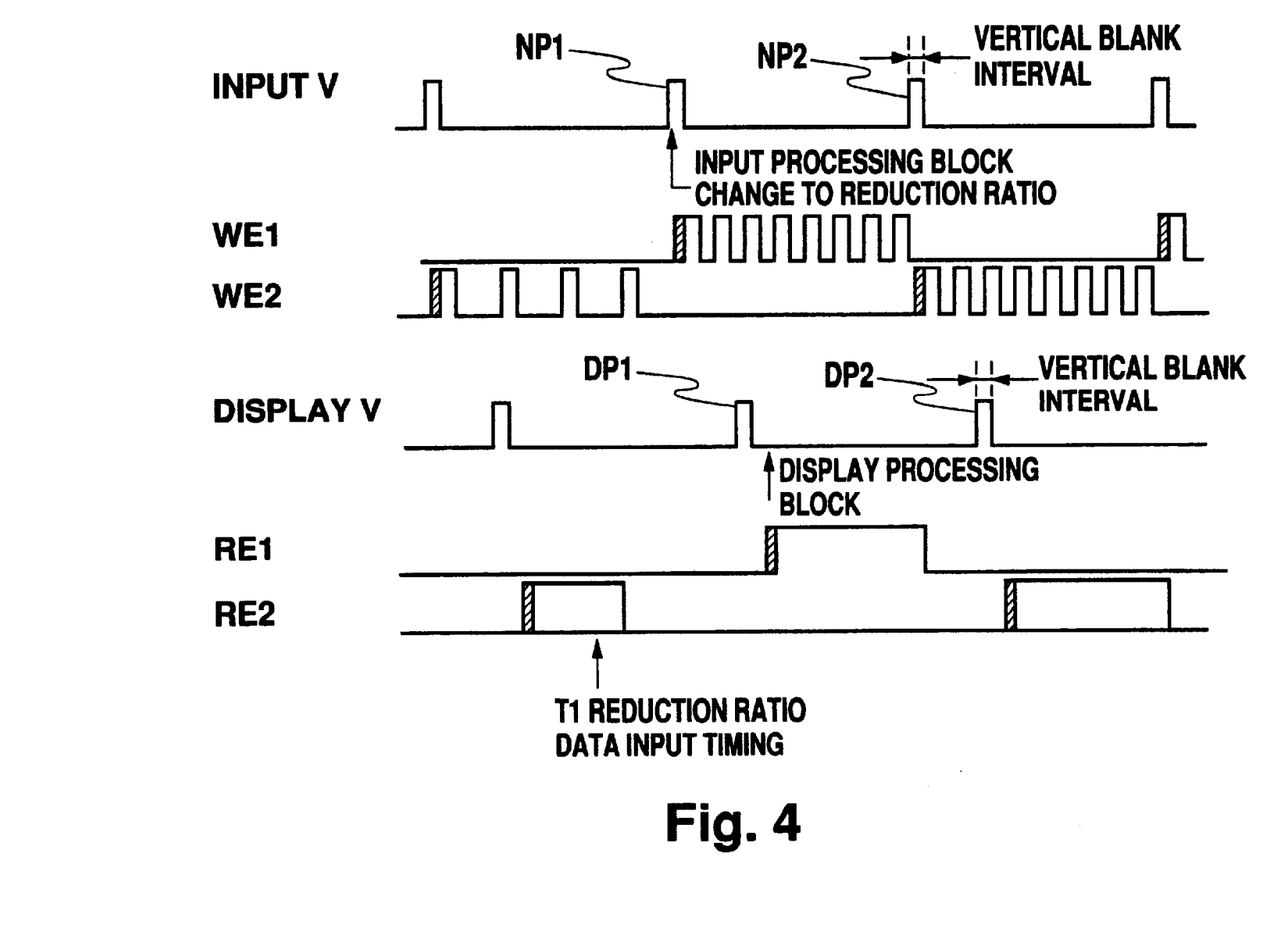
FIG. 4 is a timing chart for an operation of the reduced video signal processing circuit.

As described above, according to the present invention, SIZ data is written into the field memories 2 and 3 so as to be utilized in displaying. As a result, as shown in FIGS. 4 and 5, whenever a reduction ratio is changed, display processing in a changed reduction ratio can be reliably executed on the display processing side, beginning with the data whose reduction ratio was changed, and that can prevent distorted video display. Further, since an input V and a display V are separately supplied, they may be supplied at different timings, that is, according to different write and read clocks.

What is claimed is:

1. A reduced video signal processing circuit for reducing an input video signal according to reduction ratio data, comprising:

an input processing and write control circuit for reducing an input video signal to form a reduced video signal, and for adding data indicating a reduction ratio to the reduced video signal as a header;

a buffer memory for storing the reduced video signal having the header added thereto; and a display processing and read control circuit for obtaining a display video signal from the reduced video signal having the header added thereto and read from the buffer memory, the display video signal containing a reduced scene in a size corresponding to the reduction ratio specified by the header, wherein the display processing and read control circuit includes:

a display processing circuit that obtains data indicating a reduction ratio from the header of the reduced video signal; and a read control circuit that generates a read enable signal and a read clock to control a read timing of the buffer memory and control the position of the reduced scene based on display position data externally supplied regarding a position where the reduced video is displayed and the size of the reduced scene based on the data indicating a reduction ratio.

2. A reduced video signal processing circuit according to claim 1, wherein the reduction ratio added as a header is video size data.

3. A reduced video signal processing circuit according to claim 1, wherein a write clock used in writing the reduced video signal into the input processing and write control circuit and the read clock used in reading the reduced video signal from the display processing and read control circuit are asynchronous.

4. A reduced video signal processing circuit according to claim 1, wherein said read or write enable signal is produced at a time when a first item of the data in said header is produced.

* * * * *